(12) United States Patent
Miura et al.

(10) Patent No.: US 7,830,647 B2
(45) Date of Patent: Nov. 9, 2010

(54) CAPACITOR

(75) Inventors: Teruhisa Miura, Kyoto (JP); Hideki Shimamoto, Kyoto (JP); Shusaku Kawasaki, Osaka (JP); Masayuki Shinjou, Kyoto (JP)

(73) Assignee: Panasonic Corporation, Osaka (JP)

( * ) Notice: Subject to any disclaimer, the term of this patent is extended or adjusted under 35 U.S.C. 154(b) by 449 days.

(21) Appl. No.: 12/088,187

(22) PCT Filed: Dec. 8, 2006

(86) PCT No.: PCT/JP2006/324523
§ 371 (c)(1),
(2), (4) Date: Mar. 26, 2008

(87) PCT Pub. No.: WO2007/069538

PCT Pub. Date: Jun. 21, 2007

(65) Prior Publication Data
US 2009/0273886 A1 Nov. 5, 2009

(30) Foreign Application Priority Data

Dec. 13, 2005 (JP) ............................. 2005-358761
Dec. 13, 2005 (JP) ............................. 2005-358765

(51) Int. Cl.
*H01G 9/10* (2006.01)
(52) U.S. Cl. ...................... 361/518; 361/516; 361/517; 361/535; 361/536; 361/540
(58) Field of Classification Search ................ 361/518, 361/516, 519, 508–509, 523–528, 535–540, 361/301.3
See application file for complete search history.

(56) References Cited

U.S. PATENT DOCUMENTS

| 5,847,919 | A | * | 12/1998 | Shimizu et al. | ............. 361/517 |
| 6,064,563 | A | * | 5/2000 | Yamada et al. | ............. 361/521 |
| 6,118,646 | A | * | 9/2000 | Yang et al. | ............... 361/301.3 |
| 6,219,224 | B1 | * | 4/2001 | Honda | ......................... 361/537 |
| 6,292,348 | B1 | * | 9/2001 | Lin | ......................... 361/301.3 |
| 6,310,756 | B1 | | 10/2001 | Miura et al. | |

(Continued)

FOREIGN PATENT DOCUMENTS

JP 54-12647 6/1979

(Continued)

OTHER PUBLICATIONS

International Search Report issued Mar. 6, 2007 in the International (PCT) Application of which the present application is the U.S. National Stage.

*Primary Examiner*—Nguyen T Ha
(74) *Attorney, Agent, or Firm*—Wenderoth, Lind & Ponack, LLP.

(57) ABSTRACT

The capacitor has a capacitor element, a tubular metallic case, an electrolyte, and a terminal plate. The case contains the capacitor element and is joined to a first electrode of the capacitor element at its inner bottom surface. The terminal plate is joined to the second electrode of the capacitor element and seals the opening of the case. At least one of the terminal plate and the case is provided with a through hole, into which a hermetic plug made of a rubber-like elastic body and having an external diameter larger than a diameter of the through hole is inserted.

17 Claims, 12 Drawing Sheets

U.S. PATENT DOCUMENTS

| | | |
|---|---|---|
| 6,442,014 B1 * | 8/2002 | Lin .................... 361/301.3 |
| 7,365,962 B2 * | 4/2008 | Miura et al. ............ 361/537 |
| 2003/0148179 A1 | 8/2003 | Uyama et al. |

FOREIGN PATENT DOCUMENTS

| | | |
|---|---|---|
| JP | 2000-315632 | 11/2000 |
| JP | 2001-206397 | 7/2001 |
| JP | 2001-351587 | 12/2001 |
| JP | 2002-289172 | 10/2002 |
| JP | 2005-190689 | 7/2005 |
| JP | 2005-243391 | 9/2005 |

* cited by examiner

CAPACITOR

This application is a U.S. national stage application of PCT International Application PCT/JP2006/324523, filed Dec. 8, 2006.

TECHNICAL FIELD

The present invention relates to a capacitor used for various types of electronic devices, regeneration for a hybrid car or a fuel-cell electric vehicle, storing electric power, or the like.

BACKGROUND ART

Figure 13:
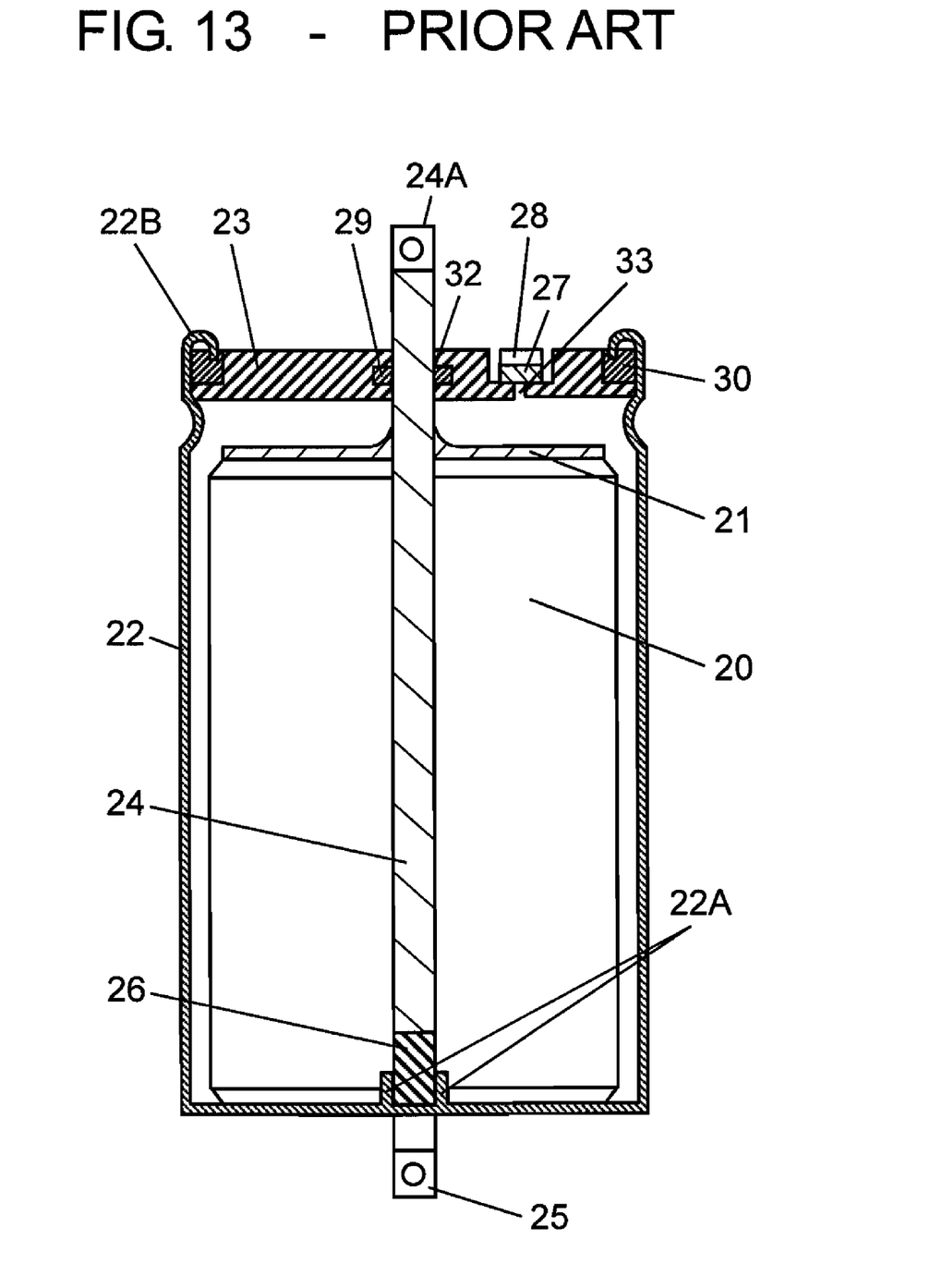
FIG. 13 is a sectional view illustrating a structure of a conventional capacitor.

FIG. 13 is a sectional view illustrating the structure of a conventional capacitor. Capacitor element 20 is contained in case 22, which is made of aluminum and has a closed-end cylinder-shape, along with an electrolyte (not shown). The upper and lower end surfaces of capacitor element 20 have positive and negative electrodes extracted therefrom. Metal plate 21 is connected to one of the electrodes of capacitor element 20. One end of rod-shaped core material 24 disposed at the central portion of capacitor element 20 has flat-shaped terminal 24A for external connection. Core material 24 and metal plate 21 are electrically connected with each other. Meanwhile, the inner bottom surface of case 22 is connected to the other electrode of capacitor element 20. Flat-shaped terminal 25 for external connection is joined to the outer surface of case 22. The inner bottom surface of case 22 is provided with projection 22A. Insulating member 26 insulates core material 24 from case 22.

Insulative sealing plate 23 seals the opening of case 22. Sealing plate 23 is provided with hole 32 through which core material 24 pierces and hole 33 through which an electrolyte is injected. O-ring 29 is incorporated into sealing plate 23 around hole 32 to seal the space between core material 24 and sealing plate 23. Block 27 made of a rubber-like elastic insulating member is combined with cap 28, and blocks hole 33, thereby forming a pressure-regulating valve. Sealing rubber 30 disposed at the top peripheral surface of sealing plate 23 is compressed by forming curled part 22B that is the opening end of case 22 curled, to seal the space between case 22 and sealing plate 23. In a capacitor thus structured, case 22 functions as a collecting terminal. Such a capacitor is disclosed in Patent document 1, for example.

However, to decrease in size and to increase in capacitance of the above-described conventional capacitor, sealing plate 23 decreases in size as the external diameter of case 22 decreases. Consequently, it is extremely difficult to provide hole 33 and a pressure-regulating valve (for allowing an internal gas to escape outward when the pressure inside the capacitor rises to a given value or higher) on shrunk sealing plate 23 from the viewpoint of space. Concretely, a capacitor with such a structure becomes difficult to produce if the external diameter of case 22 is 20 mm or smaller.

Patent document 1: Japanese Patent Unexamined Publication No. 2000-315632

SUMMARY OF THE INVENTION

The present invention is a capacitor where a terminal plate sealing the opening of the case with a small external diameter is provided with a hole through which an electrolyte is injected, and the hole is reliably sealed. The capacitor of the present invention has a capacitor element, a tubular metallic case, an electrolyte, and a terminal plate. The capacitor element has a first electrode, a second electrode, and a separator interposed therebetween. The case contains the capacitor element, and the inner bottom surface of the case has the first electrode joined thereto. The terminal plate is joined to the second electrode to seal the opening of the case. At least one of the terminal plate and case is provided with a through hole, into which a hermetic plug made of a rubber-like elastic body and having an external diameter larger than the diameter of the through hole is inserted. As described above, in a capacitor according to the present invention, a hole for injecting an electrolyte provided at the terminal plate can be reliably sealed even when the capacitor is miniaturized.

REFERENCE MARKS IN THE DRAWINGS

1 Capacitor element
2 Case
2A, 2D, 3A, 12C Recess
2B Drawn part
2C Curled part
2E, 3B, 12E Through hole (hole)
3, 11, 12 Terminal plate
4 Insulating member
5 Sealing rubber
6, 7, 8, 9, 10, 13, 34, 36 Hermetic plug (plug)
6A, 6B, 7A, 7B, 8A, 8B, 9A, 9B, 10A, 10B, 34A, 34B, 36A, 36B Flange
6C, 7C, 8C Tapered part
6D, 7D, 8D round part
7E Straight part
8E, 36D Recess
6E, 9C, 10C, 36C Attaching part
9D Slit
10D Groove
10E Appressed part
12A Screw
12B Projection
14 Pressure-regulating valve
15 First electrode
16 Second electrode
15A First current collector
16A Second current collector
15B, 16B Polarizable electrode layer
18 Separator
19 Electrolyte
20 Capacitor element
21 Metal plate
22 Case
22A Projection
22B Curled part
23 Sealing plate
24 Core material
24A, 25 Terminal
26 Insulating member
27 Block
28 Cap
29 O-ring
30 Sealing rubber
31 Substrate
32, 33 Hole
35 Insulating layer
37 Pin
37A Through hole

DETAILED DESCRIPTION OF PREFERRED EMBODIMENTS

First Exemplary Embodiment

Figure 1A:
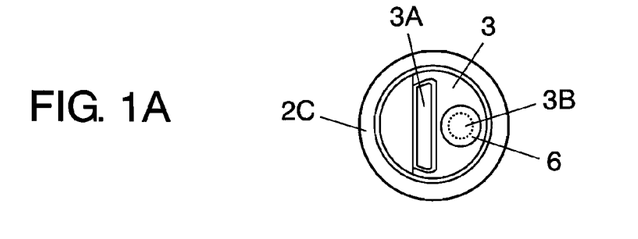
FIG. 1A is a top view of a capacitor according to a first exemplary embodiment of the present invention.
Figure 1B:
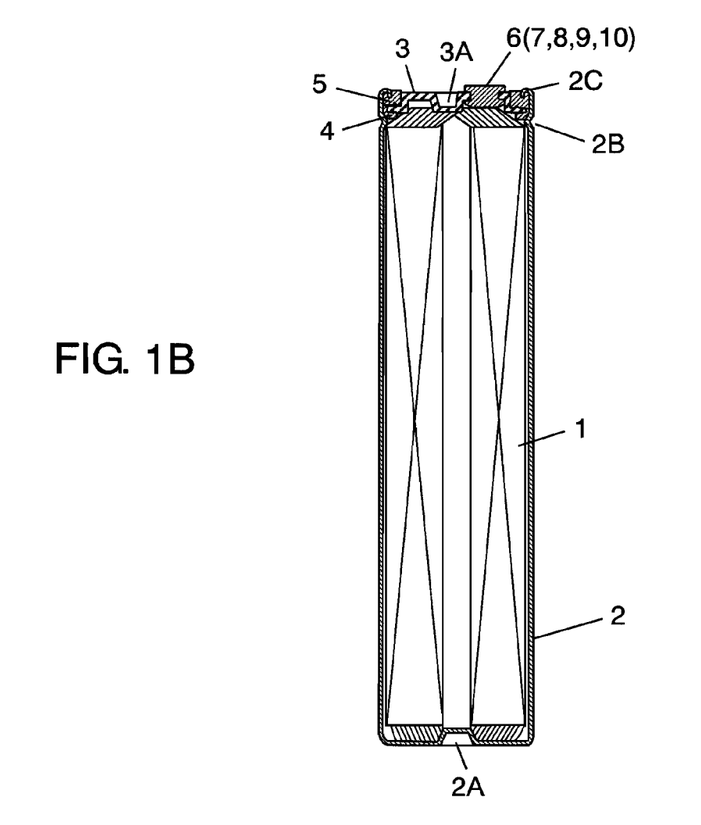
FIG. 1B is a front sectional view of the capacitor shown in FIG. 1A.
Figure 1C:
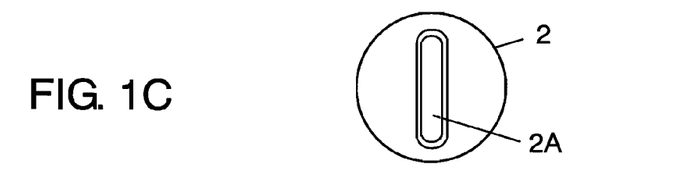
FIG. 1C is a bottom view of the capacitor shown in FIG. 1A.
Figure 1D:
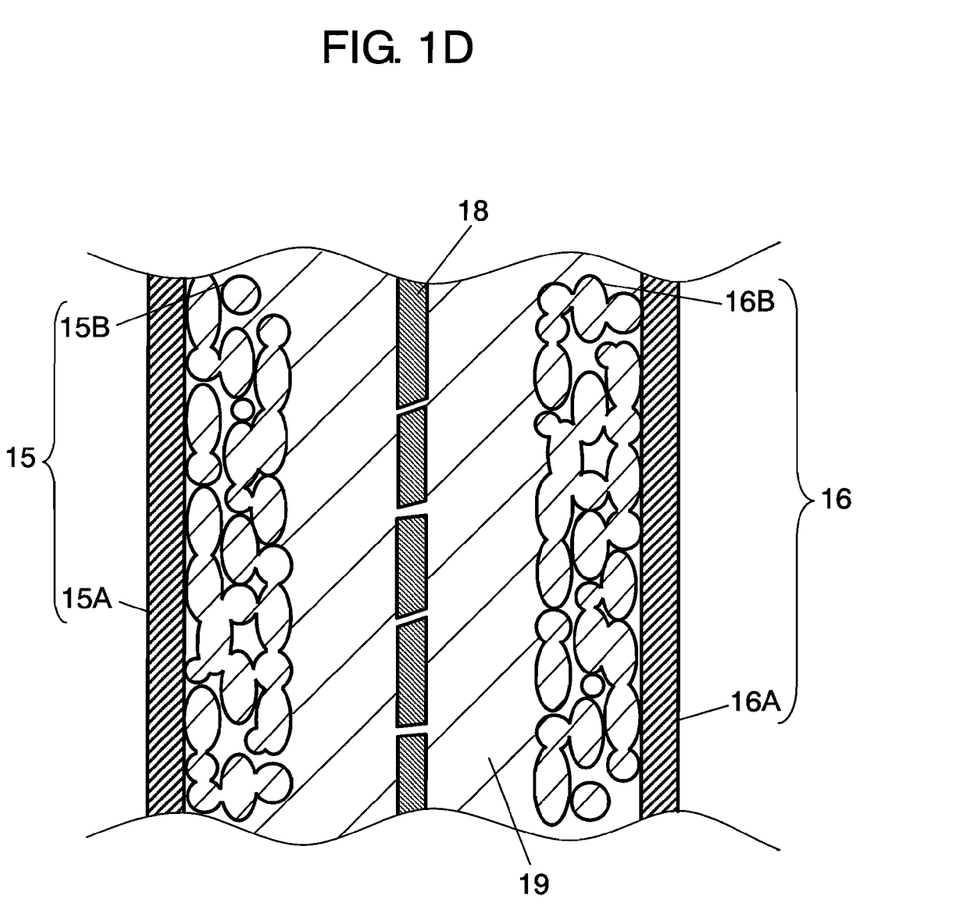
FIG. 1D is an enlarged sectional view of the capacitor element in FIG. 1B.
Figure 2A:
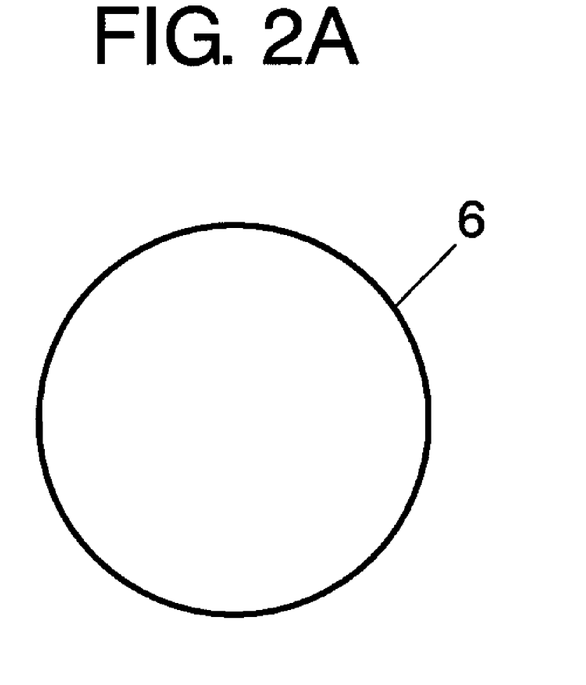
FIG. 2A is a top view of a hermetic plug used for the capacitor shown in FIG. 1A.
Figure 2B:
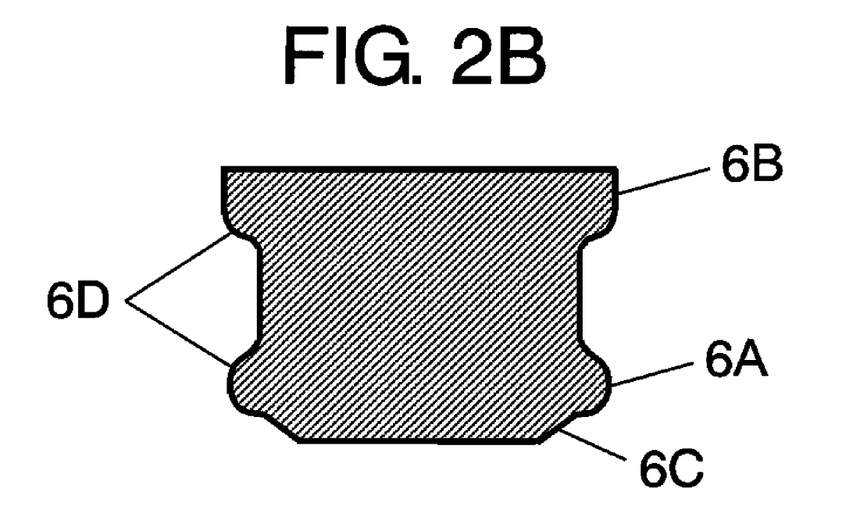
FIG. 2B is a front sectional view of the hermetic plug shown in FIG. 2A.

FIGS. 1A through 1C are a top view, a front sectional view, and a bottom view, respectively of a capacitor according to the first exemplary embodiment of the present invention. FIG. 1D is an enlarged sectional view of the capacitor element in FIG. 1B. FIGS. 2A, 2B are a top view and a front sectional view of a hermetic plug used for this capacitor.

Capacitor element 1 is formed of first electrode 15, second electrode 16, and separator 18. First electrode 15 has polarizable electrode layer 15B formed on first current collector 15A made of aluminum foil. Second electrode 16 as well has polarizable electrode layer 16B formed on second current collector 16A made of aluminum foil. Then, first electrode 15 and second electrode 16 are arranged so as to be displaced in the reverse direction, and rolled up with separator 18 interposed therebetween. Both upper and lower end surfaces of capacitor element 1 have first current collector 15A and second current collector 16A projecting therefrom, respectively.

Capacitor element 1 is contained in case 2, which is made of aluminum and a closed-end cylinder-shape, along with electrolyte 19. The bottom surface of case 2 is provided with recess 2A. First electrode 15 exposed on one end surface of capacitor element 1 is pressed to the inner surface of recess 2A and joined by such as laser welding (e.g. emitting laser light from the outer bottom surface of case 2). The inner surface of recess 2A and first electrode 15 of capacitor element 1 are thus connected with each other mechanically and electrically.

Terminal plate 3 blocks the opening of case 2. Terminal plate 3 is provided with recess 3A. Second electrode 16 exposed on the other end surface of capacitor element 1 is pressed to the bottom surface of recess 3A and joined by such as laser welding (e.g. emitting laser light from the outer surface of terminal plate 3). The bottom surface of recess 3A and second electrode 16 of capacitor element 1 are thus connected with each other mechanically and electrically.

Ring-like insulating member 4 made of insulating material is disposed on the upper part of the inner peripheral surface of drawn part 2B (formed by caulking the proximity of the opening end of case 2). Terminal plate 3 is disposed on insulating member 4. Sealing rubber 5 is disposed on the top peripheral surface of terminal plate 3 and compressed by forming curled part 2C that is the opening end of case 2 curled, to seal the space between insulate case 2 and terminal plate 3 while insulating from each other.

After an electrolyte (not shown) is injected into case 2 through hole 3B for electrolyte injection provided at terminal plate 3, hermetic plug (hereinafter referred to as "plug") 6 is press-fitted so as to block hole 3B. Plug 6 is made of a rubber-like elastic body such as butyl rubber (IIR) or ethylene-propylene terpolymer (EPT). The external diameter of plug 6 is larger than the diameter of hole 3B. In this structure, terminal plate 3 can be provided with hole 3B even when the capacitor is miniaturized. Further, such dimensional relations of plug 6 and hole 3B enable plug 6 to reliably seal hole 3B.

An insulating tape (not shown) is attached to second electrode 16 of capacitor element 1 and its proximity, thereby preventing a short circuit between the inner peripheral surface of case 2 and second electrode 16. Here, an insulating tape can be omitted by applying an insulating coat to the relevant part of the inner peripheral surface of case 2.

The beginning and end of plug 6 in the direction for inserting (i.e. vertical direction in FIG. 2) are preferably provided with first flange 6A and second flange 6B (hereinafter both referred to as "flange"), respectively. Flanges 6A, 6B prevent plug 6 from being unpluged easily or from being buried in the inside of the capacitor. The end peripheral surface of flange 6A, at the side inserted into the inside of the capacitor, is provided with tapered part 6C. Further, the periphery of flanges 6A, 6B, at the side inserted, is provided with round part 6D. In at least one of such structures, plug 6 is preferably easy to be press-fitted into hole 3B and is resistant to damage when being press-fitted. Suitably, the angle of tapered part 6C is 95° to 175°; the curvature radius of round part 6D is 0.1 mm or larger; and the maximum thickness of flanges 6A, 6B is 0.2 mm or larger.

The external diameter of the smallest part of plug 6, to be inserted into hole 3B, is preferably not smaller than 106% and smaller than 170% of the diameter of hole 3B. A smaller external diameter than this value decreases the sealing performance, thereby possibly causing leakage. On the other hand, a too large one possibly causes local breakage.

To prevent leakage while securing the sealing performance of plug 6, a stress occurring on the peripheral surface of plug 6 tightly contacting hole 3B is preferably 1.0 MPa or more. A stress smaller than this decreases the sealing performance. To examine a preferable shape and stress performance of plug 6, ten pieces of plugs 6 with different external diameters are produced. The evaluation result is shown in table 1.

TABLE 1

| Compression ratio | Leakage | Stress on outer peripheral surface (MPa) | Maximum strain (mm/mm) |
|---|---|---|---|
| 1.03 | C | 0.60 | 0.09 |
| 1.05 | B | 0.89 | 0.13 |
| 1.06 | A | 1.00 | 0.15 |
| 1.06 | A | 1.03 | 0.16 |
| 1.10 | A | 1.61 | 0.24 |
| 1.20 | A | 3.05 | 0.46 |
| 1.30 | A | 4.49 | 0.68 |
| 1.50 | A | 7.37 | 1.11 |
| 1.70 | B | 10.25 | 1.54 |
| 1.75 | C | 10.97 | 1.65 |

In table 1, the leakage of an electrolyte is examined by varying compression ratio by changing the external diameter of plug 6 press-fitting into hole 3B with its diameter of 1. The leakage is evaluated while a gas pressure of 0.6 MPa is applied to plug 6. Linear structural analysis and experiments are performed for plug 6 made of IIR or EPT with a Young's modulus of approximately 5.0 MPa, a Poisson's ratio of 0.48, a breaking elongation of not less than 200% to not more than 300%. In the leakage evaluation in table 1, "C" indicates leakage occurs in 5 or more samples, "B" indicates leakage occurs in 1 to 4 samples, and "A" indicates leakage does not occur in all samples.

From table 1, for a compression ratio of plug 6 of 1.05% or smaller, leakage is assumed to occur due to a small reactive force by plug 6 against the inner peripheral surface of hole 3B. For a compression ratio exceeding 170%, leakage occurs as well. For a compression ratio of 170%, the maximum strain measured by linear structural analysis is 1.54 mm per 1 mm, as shown in table 1. Such a large strain causes the rate of elongation of plug 6 to be 254% locally. Thus, the leakage is assumed to be caused as a result that local breakage occurs in plug 6, and thus a leakage path is generated due to a decrease in the reactive force on the inner peripheral surface of hole 3B and breakage of the material. From these results, in order for plug 6 to seal hole 3B, the external diameter of the smallest part of plug 6 which is to be fitted into hole 3B is preferably not smaller than 106% and smaller than 170% of the diameter of hole 3B.

At a compression ratio of plug 6 of 1.05%, the stress occurring on the outer peripheral surface of plug 6 measured by linear structural analysis is 0.89 MPa. At a compression ratio of plug 6 of 1.06%, the stress ranges between 1.00 MPa and 1.03 MPa, with some variation, where no leakage occurs in any case. From these results, the stress occurring on the outer peripheral surface of plug 6 needs to be at least 1.0 MPa, which does not depend on material of plug 6. Meanwhile, the upper limit of the stress depends on the strength of material of plug 6. From all of these, as the sealing performance against leakage, the stress occurring on the peripheral surface of plug 6 tightly contacting hole 3B is preferably 1.0 MPa or more.

Figure 3A:
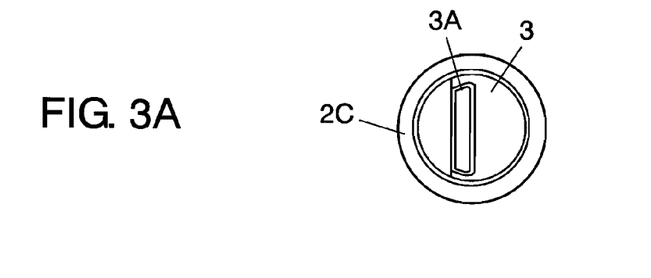
FIG. 3A is a top view of another capacitor according to the first embodiment of the present invention.
Figure 3B:
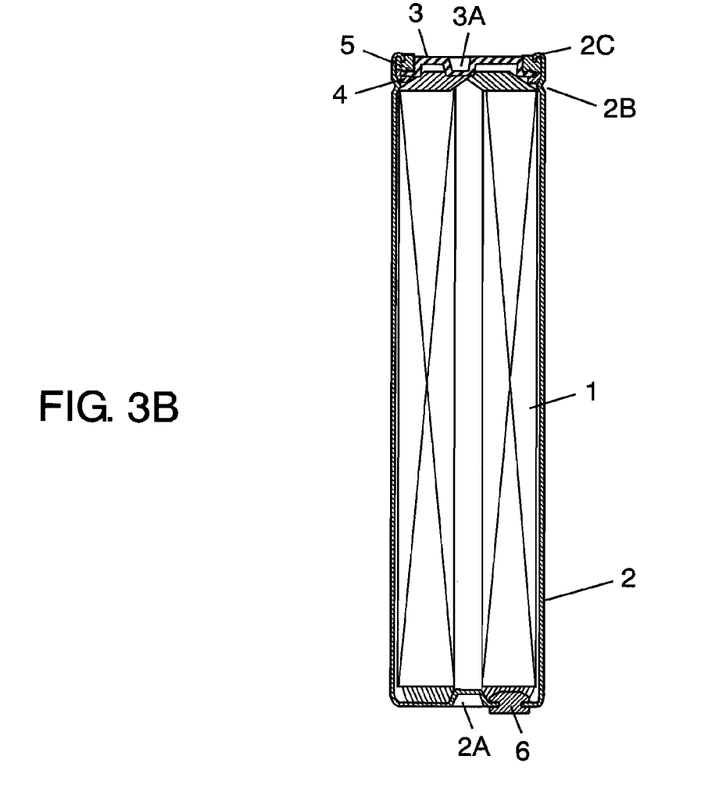
FIG. 3B is a front sectional view of the capacitor shown in FIG. 3A.
Figure 3C:
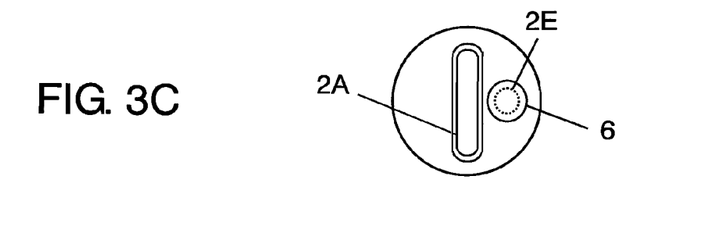
FIG. 3C is a bottom view of the capacitor shown in FIG. 3A.

As shown in FIGS. 3A through 3C, hole 2E for electrolyte injection may be provided at the base of case 2, not in terminal plate 3, to be sealed with plug 6. Such a structure brings the same advantage as those in FIGS. 1A through 1C. Further, both hole 3B and hole 2E may be provided to be sealed with plug 6. In this case, injecting an electrolyte becomes easy, which is the same for other shapes of hermetic plugs described hereinafter.

Figure 4A:
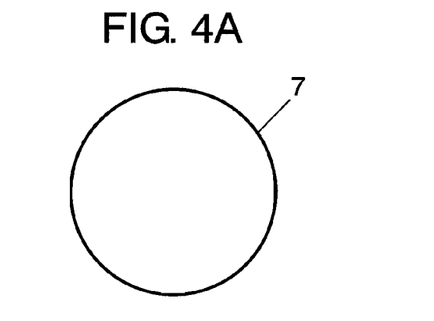
FIG. 4A is a top view of another hermetic plug used for the capacitor shown in FIG. 1A.
Figure 4B:
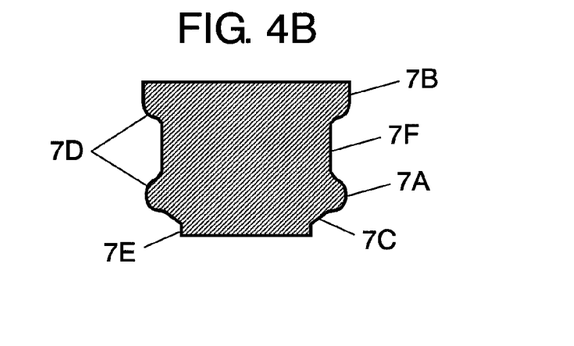
FIG. 4B is a front sectional view of the hermetic plug shown in FIG. 4A.

Next, a description is made for the shape of a hermetic plug with its workability improved when press-fitting into hole 3B. FIGS. 4A and 4B are a plan view and a front sectional view illustrating another example of a hermetic plug. Hermetic plug (hereinafter referred to as "plug") 7, as well as plug 6, is provided with flanges 7A, 7B, tapered part 7C, round part 7D, and straight part 7E between the end surface at the flange 7A side and tapered part 7C. Straight part 7E extends in the direction for inserting plug 7 from flange 7A and is thinner than attaching part 7F provided between flanges 7A and 7B. Straight part 7E thus provided facilitates plug 7 to be press-fitted into hole 3B.

Figure 5A:
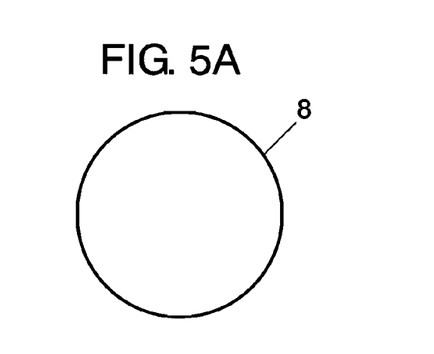
FIG. 5A is a top view of still another hermetic plug used for the capacitor shown in FIG. 1A.
Figure 5B:
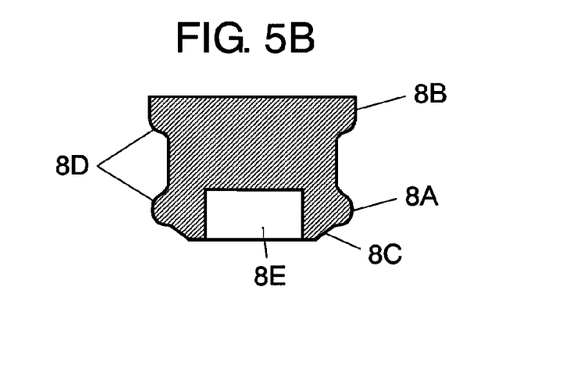
FIG. 5B is a front sectional view of the hermetic plug shown in FIG. 5A.

FIGS. 5A, 5B are as well a plan view and a front sectional view illustrating still another example of a hermetic plug. Hermetic plug (hereinafter referred to as "plug") 8, as well as plug 6, is provided with flanges 7A, 7B, tapered part 7C, round part 7D, and recess 8E on the end surface at the flange 8A side. That is, recess 8E is provided on the end surface in the direction for inserting plug 8. With this structure, the end to be inserted is subject to deformation, thereby facilitating plug 8 to be inserted. Particularly, recess 8E deeper than round part 8D of flange 8A decreases a stress at the flange 8A side, thereby facilitating plug 8 to be press-fitted into hole 3B.

Figure 6A:
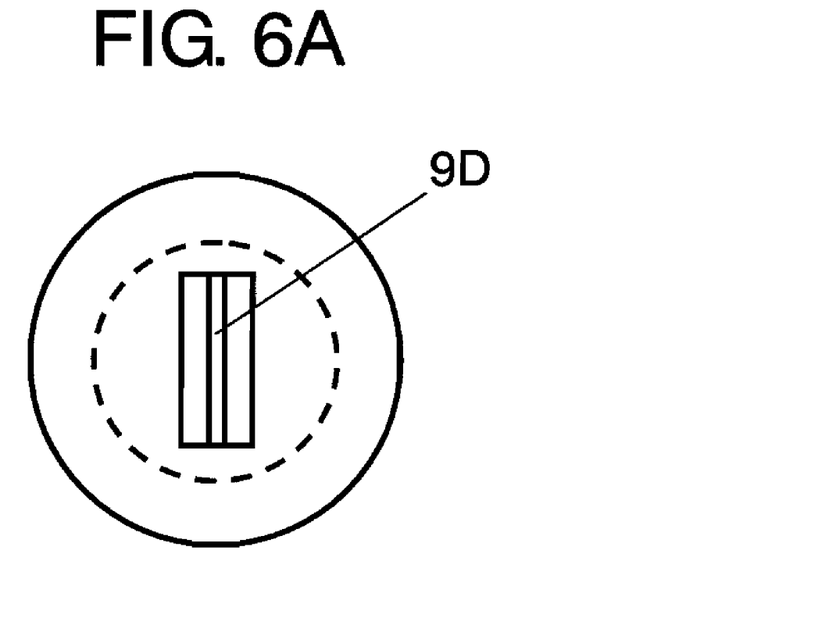
FIG. 6A is a top view of yet another hermetic plug used for the capacitor shown in FIG. 1A.
Figure 6B:
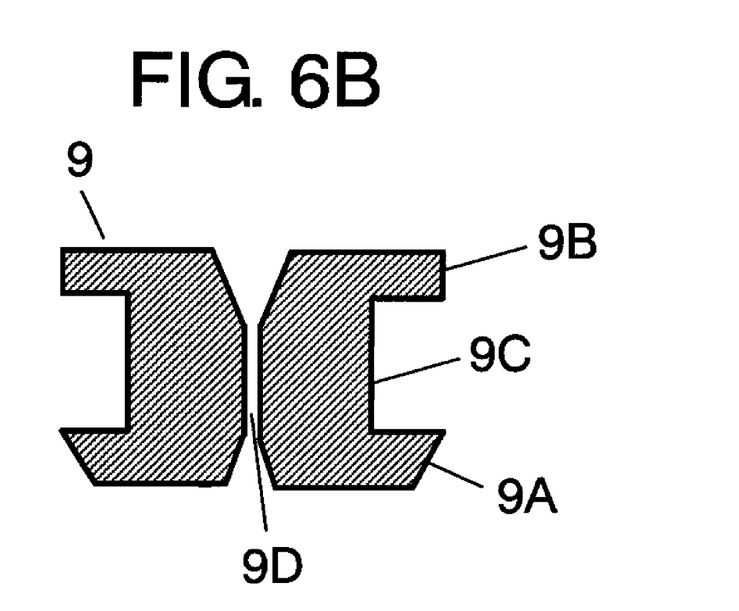
FIG. 6B is a front sectional view of the hermetic plug shown in FIG. 6A.

Next, a description is made for an example where a hermetic plug has a pressure-regulating function. FIGS. 6A, 6B are a top view and a front sectional view of such a hermetic plug. The bottom and top ends of hermetic plug (hereinafter referred to as "plug") 9 are provided with flanges 9A, 9B, respectively, and the vertically central part of plug 9 has attaching part 9C, which is inserted into hole 3B to be cramped and formed circularly.

In addition, the central part is provided with slit 9D vertically communicating. In a state of plug 9 press-fitted into hole 3B, the entire plug 9 is compressed toward the center. Consequently, slit 9D is sealed, thereby preventing an electrolyte injected into case 2 from leaking.

When the pressure within the capacitor thus formed rises to a given value or higher, the increased pressure presses and expands slit 9D. Slit 9D is pressed and expanded with a pressure of 0.15 MPa to 1.0 MPa, for example. Consequently, the inside of case 2 communicates partially with the outside, from which the internal gas is discharged outward, thereby decreasing the pressure inside case 2. When the pressure inside case 2 decreases to a given value or lower, slit 9D provided at plug 9 is again sealed in close contact, and plug 9 seals so as to prevent an electrolyte injected into case 2 from leaking.

Plug 9 thus seals hole 3B and regulates the pressure inside case 2. Consequently, even a miniaturized capacitor without a space for a pressure-regulating valve can be reliable with a pressure-regulating function.

Both ends of slit 9D are preferably provided with tapered parts. The tapered parts do not contact the hole closely, and thus a gas inside case 2 is reliably discharged outward. The periphery of flange 9A at the bottom end is preferably provided with a tapered part, which facilitates plug 9 to be press-fitted into hole 3B.

Figure 7A:
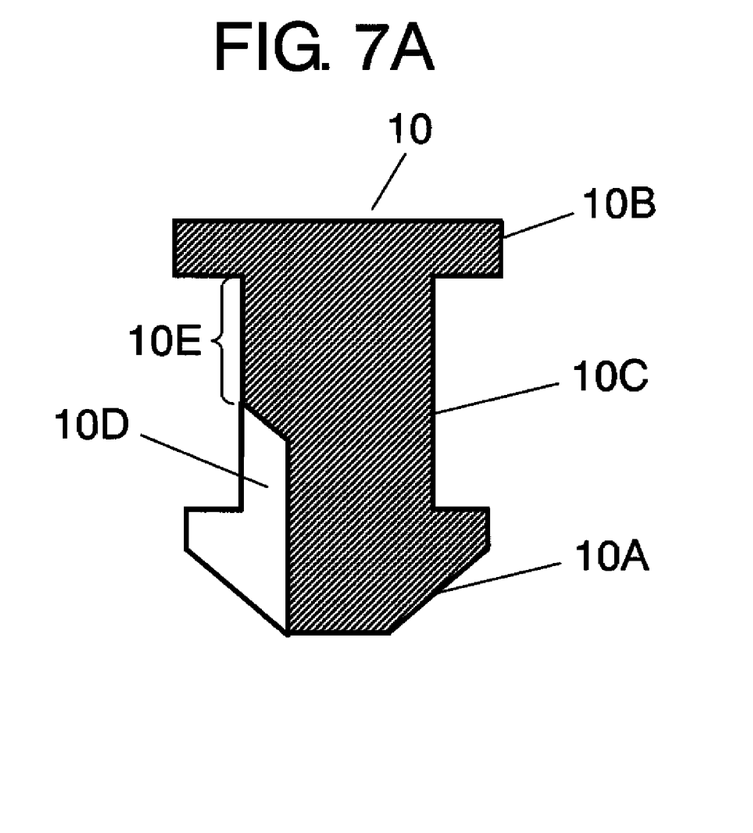
FIG. 7A is a front sectional view of further another hermetic plug used for the capacitor shown in FIG. 1A.
Figure 7B:
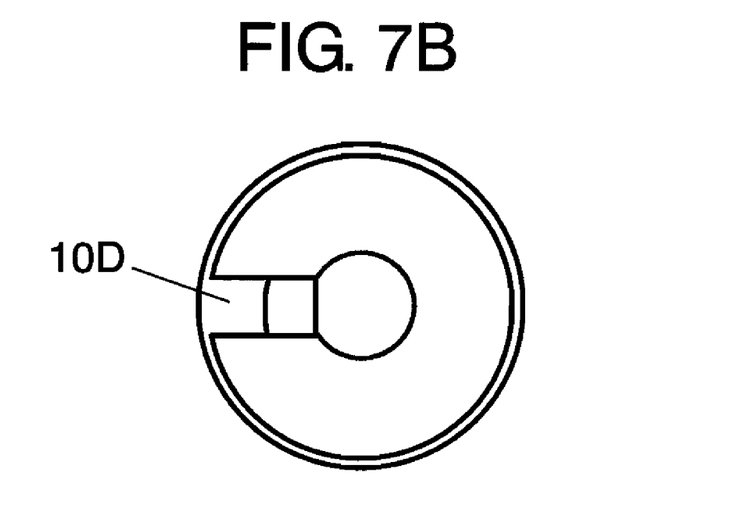
FIG. 7B is a bottom view of the hermetic plug shown in FIG. 7A.
Figure 8A:
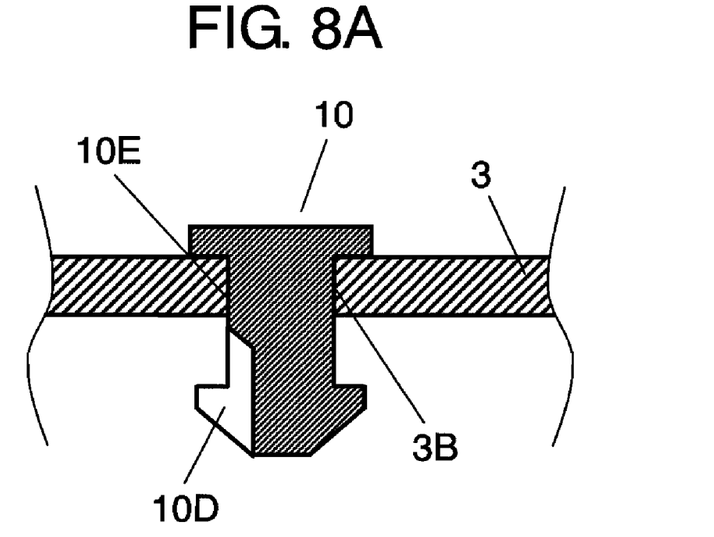
FIG. 8A is a sectional view of the substantial part of the hermetic plug shown in FIG. 7A, in an attached state.
Figure 8B:
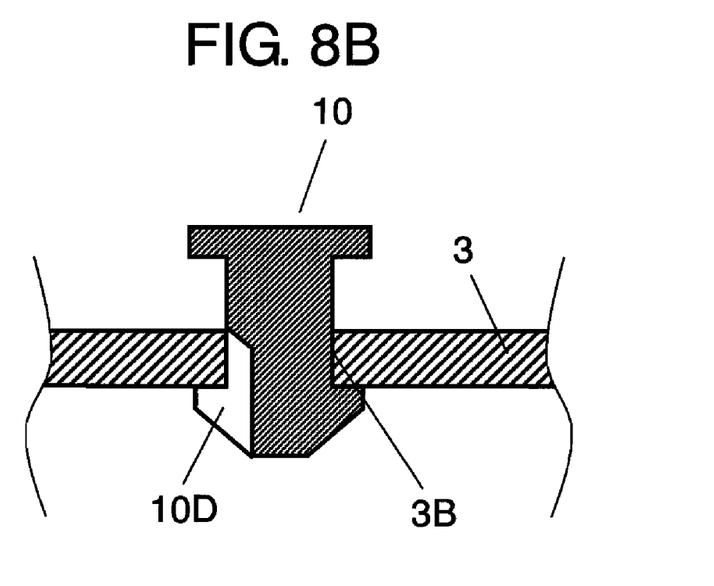
FIG. 8B is a sectional view of the substantial part of the hermetic plug shown in FIG. 7A, in an operating state.

Next, a description is made for another example where the hermetic plug has a pressure-regulating function. FIGS. 7A, 7B are a front sectional view and bottom view of such a hermetic plug. FIGS. 8A, 8B are sectional views of the substantial parts of the hermetic plug in an attached and operating state, respectively.

The bottom and top ends of hermetic plug (hereinafter referred to as "plug") 10 are provided with flanges 10A, 10B, respectively, and the vertically central part of plug 10 has attaching part 10C, which is inserted into hole 3B to be cramped and formed circularly. Attaching part 10C is formed with a length approximately twice the thickness of terminal plate 11, and the lower part of attaching part 10C, excluding the part tightly contacting terminal plate 11, is provided with groove 10D vertically cut into a part of the peripheral surface. Appressed part 10E, where plug 10 tightly contacts the terminal plate, is formed between groove 10D and flange 10B. In other words, plug 10 is provided with groove 10D extending beyond the thickness of terminal plate 3, from the beginning toward the end in the direction for inserting plug 10, and appressed part 10E between groove 10D and the end in the direction for inserting plug 10.

A description is made for the operation of plug 10 thus formed. First, as shown in FIG. 8A, plug 10 is press-fitted into hole 3B in terminal plate 3, and flange 10B is in close contact with terminal plate 3, in a usual state. Consequently, plug 10 reliably seals hole 3B. As shown in FIG. 8B, a rise of the pressure inside case 2 causes plug 10 to be pressed up to a position where flange 10A tightly contacts terminal plate 11, resulting in groove 10D provided at the lower part of attaching part 10C to be exposed at the front surface of terminal plate 11. Consequently, the inside of case 2 communicates with the outside, allowing a gas inside case 2 to escape outward to decrease the pressure. That is, plug 10 moves in the direction opposite to insertion when the pressure inside case 2 rises to a given value or higher, allowing a gas inside case 2 to escape outward through groove 10D. Here, the user can press plug 10 pressed up into the hole (the state shown in FIG. 8A) to seal case 2 with plug 10 again.

Plug 10 thus seals hole 3B and regulates the pressure inside case 2. Consequently, even a miniaturized capacitor without a space for a pressure-regulating valve can be reliable with a pressure-regulating function.

Here, the periphery of flange 10A at the bottom end is preferably provided with a tapered part, which facilitates press-fitting plug 10 into hole 3B.

Figure 9:
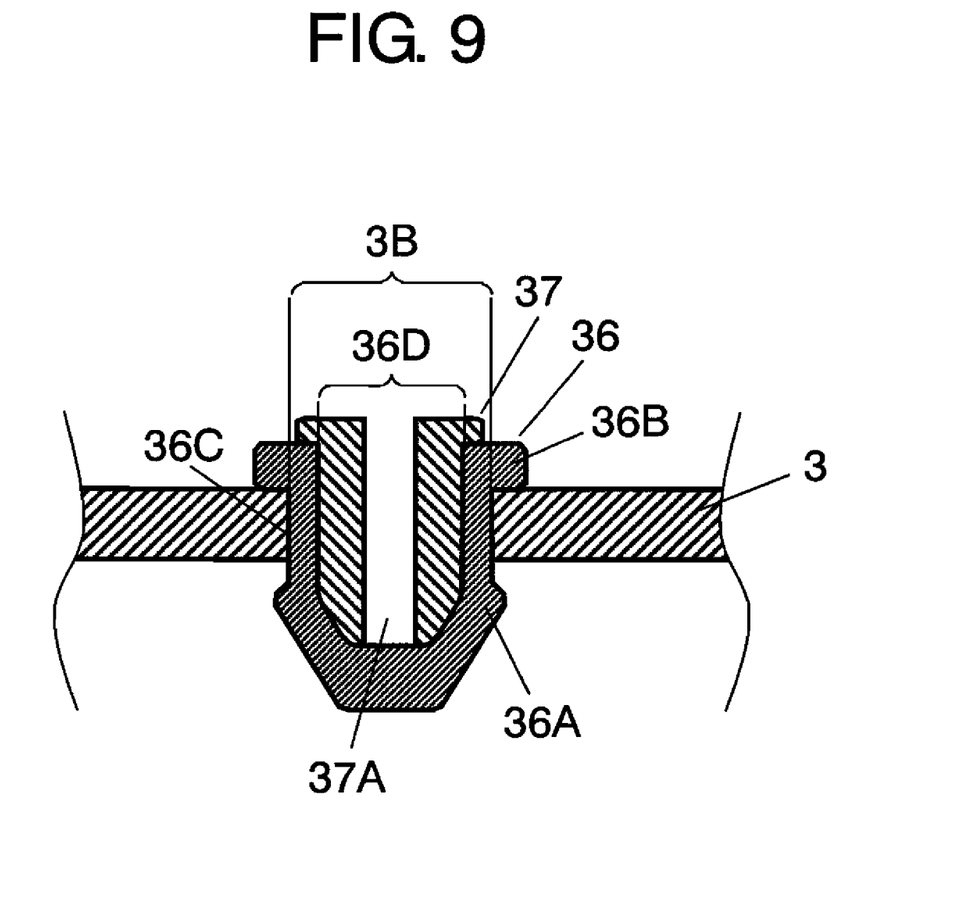
FIG. 9 is a sectional view of the substantial part of still further another hermetic plug used for the capacitor shown in FIG. 1A, in an attached state.

Next, a description is made for another example of a hermetic plug formed of two members. FIG. 9 is a sectional view of the substantial part of such a hermetic plug, in an attached state. The bottom and top ends of hermetic plug (hereinafter referred to as "plug") 36 are provided with flanges 36A, 36B, respectively, and the vertically central part of plug 36 has attaching part 36C, which is inserted into hole 3B to be cramped and formed circularly. The central part is provided with recess 36D outside the insertion direction, where pin 37 is inserted into recess 36D. Plug 36 is made of elastic material such as rubber as well as the other hermetic plugs, and pin 37 is made of material such as metal or resin, harder than plug 36.

To attach plug 36 and pin 37 in this way, plug 36 is inserted into hole 3B first. In this case, with recess 36D provided, plug 36 is subject to deformation, thereby facilitating hole 3B to be attached. Then, pin 37 is inserted into recess 36D. This seals recess 36D with pin 37, and thus plug 36 becomes resistant to deformation. As a result, plug 36 can seal hole 3B in the same way as in FIG. 2B. Using plug 36 and pin 37 in this way improves the attaching workability compared to a hermetic plug without a recess or hollow provided inside, such as plug 6.

Here, the central part of pin 37 is preferably provided with hole 37A piercing in the direction for inserting pin 37. When inserting pin 37 into recess 36D, air inside recess 36D escapes through hole 37A. This prevents pin 37 from lifting toward the insertion side due to compressed air after pin 37 is inserted into recess 36D.

There are no hollows between flanges of plugs 7, 8, 10 shown in FIGS. 4B, 5B, 7A as well, and thus the external diameter at these parts is preferably not smaller than 106% and smaller than 170% of the diameter of hole 3B. In plug 36 shown in FIG. 9, because recess 36D is sealed with pin 37, the external diameter of attaching part 36C is preferably not smaller than 106% and smaller than 170% of the diameter of hole 3B, as well as in plug 6. A stress occurring on the peripheral surface of plugs 7, 8, 10, 36 is preferably 1.0 MPa or more when it is appressed to hole 3B. Even in a case where there is a hollow (slit 9D) between the flanges, as in plug 9 shown in FIG. 6B, the external diameter of attaching part 9C (excluding the thickness of slit 9D) is preferably not smaller than 106% and smaller than 170% of the diameter of hole 3B. A stress occurring on the peripheral surface of attaching part 9C is preferably 1.0 MPa or more when it is appressed to hole 3B.

Second Exemplary Embodiment

Figure 10A:
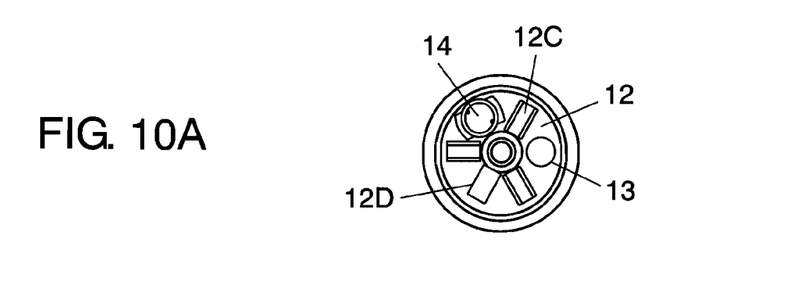
FIG. 10A is a top view of a capacitor according to a second exemplary embodiment of the present invention.
Figure 10B:
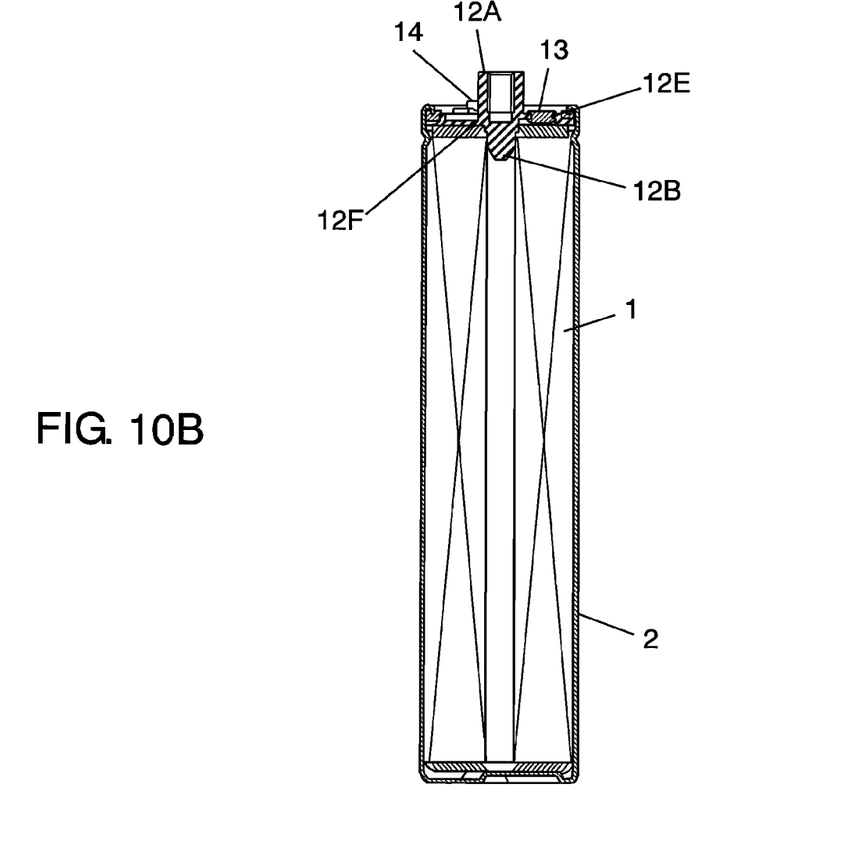
FIG. 10B is a front sectional view of the capacitor shown in FIG. 10A.
Figure 10C:
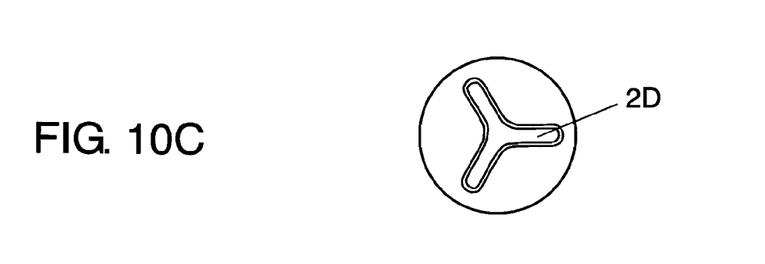
FIG. 10C is a bottom view of the capacitor shown in FIG. 10A.

FIGS. 10A through 10C are a top view, a front sectional view, and a bottom view, respectively, of a capacitor according to the second exemplary embodiment of the present invention. In the capacitor according to the embodiment, a hermetic plug with a pressure-regulating function, which is described using FIGS. 6A through 8B is not used, but one of the hermetic plugs shown in FIGS. 2B, 4B, 5B, 9 is used, and a pressure-regulating valve is provided at the terminal plate. Components other than these are the same as the first embodiment, and thus a same component is given the same mark to omit its detailed description. Only the differences are described hereinafter using the related drawings.

Terminal plate 12 has screw 12A for external connection. Hermetic plug (hereinafter referred to as "plug") 13 is press-fitted into hole 12E for electrolyte injection provided at terminal plate 12. Pressure-regulating valve 14 is attached to terminal plate 12. Pressure-regulating valve 14 is formed by sealing hole 12F provided at terminal plate 12 with a gas-permeable sheet and a rubber valve, and by fixing them with a cap.

The inner surface of terminal plate 12 is provided with projection 12B. The outer surface of terminal plate 12 is provided with recess 12C and with projection 12D for anti-rotation. The bottom surface of case 2 is provided with recess 2D.

In the capacitor thus formed, the pressure inside case 2 of a given value or higher causes pressure-regulating valve 14 provided at terminal plate 12 to open, allowing the inside gas to escape outward. The operating pressure of pressure-regulating valve 14 is set to 0.15 MPa to 1.0 MPa, for example. Consequently, plug 13 is not necessary to have a pressure-regulating function, thereby allowing one of plugs 6, 7, 8, or plug 36 and pin 37 with a simple structure according to the first embodiment to be used for plug 13. Accordingly, when terminal plate 12 has a space for attaching plug 13 and pressure-regulating valve 14, both can be attached simultaneously.

Third Exemplary Embodiment

Figure 11:
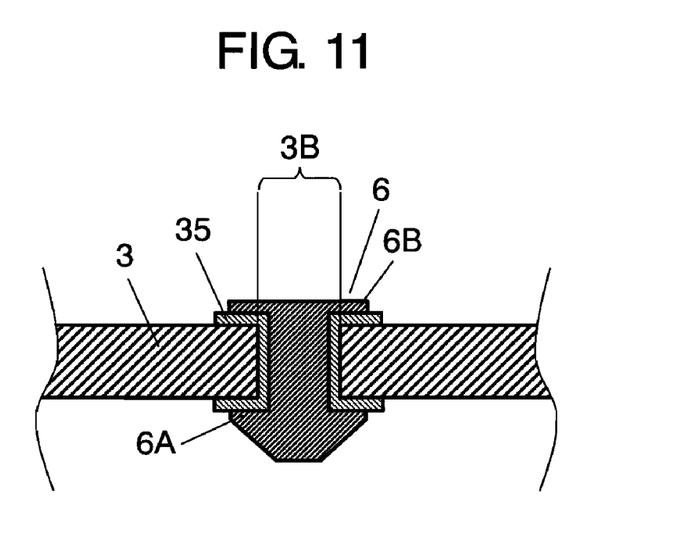
FIG. 11 is a sectional view of the substantial part of a hermetic plug used for a capacitor according to a third exemplary embodiment of the present invention, in an attached state.

FIG. 11 is a sectional view of the substantial part of a hermetic plug used for a capacitor according to the third embodiment of the present invention, in an attached state. This embodiment is different from the first embodiment in that the inner peripheral surface of hole 3B provided at terminal plate 3 and part of the front and back surfaces linking to the inner peripheral surface are provided with insulating layer 35. Otherwise the basic structure is the same as the first embodiment described using FIGS. 1A through 2B. Insulating layer 35 is formed with material not dissolving by an electrolyte, such as polypropylene resin. Hereinafter, advantages of insulating layer 35 are described referring to FIG. 1B as well.

One electrode of capacitor element 1 is joined to terminal plate 3, and the other is joined to case 2. If the negative electrode of capacitor element 1 is joined to terminal plate 3, using the capacitor in a high-temperature, high-humidity environment facilitates the electrolyte to permeate into the interface between terminal plate 3 and hermetic plug (hereinafter referred to as "plug") 6, thereby possibly causing the electrolyte to leak outward.

This phenomenon is supposed to occur in the following way. That is, moisture contained in the electrolyte electrochemically reacts with aluminum composing terminal plate 3 (negative electrode) near plug 6 to generate hydroxide ions according to formula (1). The hydroxide ions react with positive ions in the electrolyte to cause the electrolyte to show alkalinity. The electrolyte thus alkalified passes through the interface between terminal plate 3 and plug 6 to contact the entire plug 6. This alkali breaks the chemically cross-linked structure of plug 6 to deteriorate plug 6. This decreases the sealing performance of plug 6 to cause the electrolyte to leak outward.

$$H_2O + \frac{1}{2}O_2 + 4e^- \rightarrow 2OH^- \quad (1)$$

A slight gap in the interface between terminal plate 3 and plug 6 can allow the electrolyte showing alkalinity to permeate thereinto due to an interfacial tension, thereby possibly causing leakage. For this reason, terminal plate 3 and plug 6 need to tightly contact each other to eliminate leakage of the electrolyte.

Meanwhile, when the positive electrode of capacitor element 1 is joined to terminal plate 3, for example, tetraethylammonium fluoroborate ($N(C_2H_5)_4BF_4$) as the solute of an electrolyte is used, tetrafluoroborate anion ($BF_4^-$) (i.e. negative ions in the electrolyte) approaches the sealed part of case 2, and hydronium ions ($H_3O^+$) are generated in the electrolyte with the reaction shown by formula (3) through formula (2). With this reaction, the electrolyte near terminal plate 3 shows acidity. When the electrolyte showing acidity passes through the interface between terminal plate 3 and plug 6 and contacts terminal plate 3, the electrolyte corrodes the surface of terminal plate 3, thereby decreasing the sealing performance of plug 6.

$$BF_4^- + H_2O \rightleftharpoons BF_3(OH)^- + HF \quad (2)$$

$$HF + H_2O \rightarrow H_3O^+ + F^- \quad (3)$$

However, in this embodiment, the aluminum forming terminal plate 3 is covered with insulating layer 35, which as a result an electrochemical reaction does not occur even when the negative electrode of capacitor element 1 is joined to terminal plate 3. Consequently, hydroxide ions are not generated or the electrolyte does not show alkalinity, which as a result suppresses a decrease of the sealing performance of plug 6. In this case, flanges 6A and 6B can also seal hole 3B by closely contacting terminal plate 3.

Insulating layer 35 may be formed of, other than polypropylene resin, resin or the like made of a mixture of IIR, EPT or styrene-butadiene rubber, and alicyclic petroleum resin, aliphatic petroleum resin or terpene resin. In other words, any material may be used as long as it is not dissolved by an electrolyte and is insulative.

Insulating layer 35 is preferably formed of water-repellent material such as polypropylene resin. Even when an electrolyte showing acidity passes through the interface between terminal plate 3 and plug 6, insulating layer 35 formed with such material prevents the electrolyte from contacting terminal plate 3 in a case where the positive electrode of capacitor element 1 is joined to terminal plate 3. This suppresses corrosion of the surface of terminal plate 3 at the interface between terminal plate 3 and plug 6, which as a result suppresses a decrease of the sealing performance of plug 6.

In this embodiment, the description is made for the case where sealing is made by inserting plug 6 into hole 3B. However, in a case where sealing is made using such as a pressure-regulating valve or explosion-proof valve, instead of plug 6, the same advantage is achieved by forming insulating layer 35 at the inner peripheral surface of hole 3B and part of the front and back surfaces of terminal plate 3 linking to the inner peripheral surface.

As described in the first embodiment using FIGS. 4A through 4C, hole 2E for electrolyte injection may be provided in the bottom of case 2. In this case, it is adequate if insulating layer 35 is provided on the inner peripheral surface of hole 2E and part of the front and back surfaces of case 2 linking to the inner peripheral surface.

Figure 12:
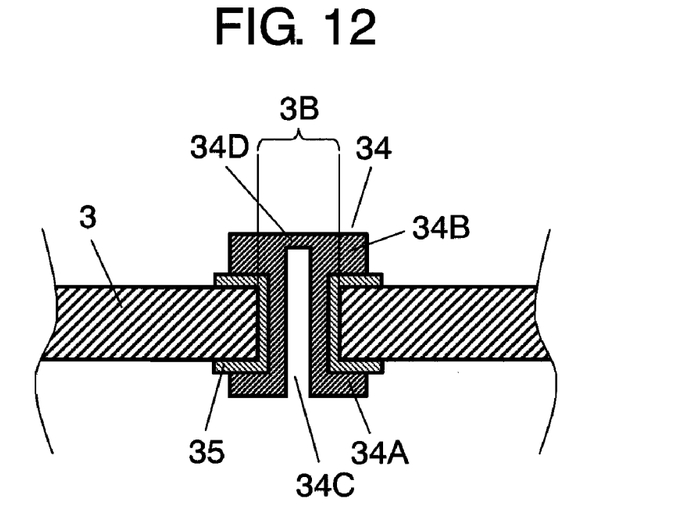
FIG. 12 is a sectional view of the substantial part of another hermetic plug used for a capacitor according to the third embodiment of the present invention, in an attached state.

If the hermetic plug can seal hole 3B by tightly contacting the flange to terminal plate 3 through insulating layer 35, the hermetic plug can have an explosion-proof function as well. FIG. 12 is a sectional view illustrating the structure of such hermetic plug 34. Hermetic plug 34 is mounted to hole 3B, which is provided at terminal plate 3 and whose inner surface is covered with insulating layer 35. The central portion of hermetic plug 34 is provided with hollow 34C at the side inward of the capacitor, in an attached state. The top end of hollow 34C is sealed with thin-walled member 34D. Hermetic plug 34 seals hole 3B by tightly contacting flanges 34A, 34B to terminal plate 3 through insulating layer 35.

If the inner pressure of the capacitor rises to a given value in this state, the pressure breaks thin-walled member 34D to cause the gas in the capacitor to be discharged outward, with which hermetic plug 34 fulfils an explosion-proof function.

Hereinbefore, the description is made for an electric double-layer capacitor with capacitor element 1 formed of a pair of electrodes, where polarizable electrode layers are formed on both surfaces of a pair of current collectors, and a separator. However, the present invention is not limited to this structure, but is applicable to another type of capacitor with an electrolyte such as an aluminum electrolytic capacitor.

INDUSTRIAL APPLICABILITY

A capacitor according to the present invention can be provided with a hole for injecting an electrolyte and a pressure-regulating function at the terminal plate, which is useful for a hybrid car, for example.

The invention claimed is:

1. A capacitor comprising:
a capacitor element having a first electrode, a second electrode, and a separator interposed between the first electrode and the second electrode;
a tubular and metallic case containing the capacitor element, with the first electrode joined to an inner bottom surface of the case;
an electrolyte contained in the case; and
a terminal plate joined to the second electrode and sealing an opening of the case,
wherein at least one of the terminal plate and the case is provided with a through hole, and a hermetic plug made of a rubber-like elastic body and having an external diameter larger than a diameter of the through hole is inserted.

2. The capacitor according to claim 1, wherein the hermetic plug has a first flange at a beginning in a direction for inserting the hermetic plug and a second flange at an end in the direction.

3. The capacitor according to claim 2, wherein a periphery of an end surface of the first flange is provided with a tapered part.

4. The capacitor according to claim 2, wherein peripheries of the first flange and the second flange, at a side of insertion, are provided with round parts.

5. The capacitor according to claim 2, wherein the hermetic plug has an attaching part between the first flange and the second flange, and a straight part thinner than the attaching part, the straight part extending from the first flange in a direction for inserting the hermetic plug.

6. The capacitor according to claim 1, wherein an end surface in a direction for inserting the hermetic plug is provided with a recess.

7. The capacitor according to claim 1, wherein the hermetic plug is provided with a slit vertically communicating, and allows a gas inside the case to escape outward when a pressure inside the case rises to a given value or higher.

8. The capacitor according to claim 1,
wherein the hermetic plug is provided with a groove extending from a beginning in a direction for inserting the hermetic plug toward an end in the direction beyond at least one of thicknesses of the terminal plate and the case, to which the hermetic plug is attached,
wherein the hermetic plug is provided with an appressed part, which is appressed to at least one of the terminal plate and the case to which the hermetic plug is attached, between the groove and the end in the direction for inserting the hermetic plug, and
wherein the hermetic plug is movable in a direction opposite to insertion due to a pressure inside the case when the pressure inside the case rises to a given value or higher, thereby allowing a gas inside the case to escape outward through the groove.

9. The capacitor according to claim 1, wherein an outside in a direction for inserting the hermetic plug is provided with a recess, and a pin harder than the hermetic plug is inserted into the recess.

10. The capacitor according to claim 9, wherein the pin is provided with a through hole piercing in a direction for inserting the pin.

11. The capacitor according to claim 1, wherein the hermetic plug is made of one of butyl rubber and ethylene-propylene terpolymer.

12. The capacitor according to claim 11, wherein an external diameter of a smallest part of a peripheral surface of the hermetic plug is at least 106% and smaller than 170% of a diameter of the through hole.

13. The capacitor according to claim 1, wherein a stress occurring on a peripheral surface of the hermetic plug tightly contacting the through hole is at least 1.0 MPa.

14. The capacitor according to claim 1, wherein the terminal plate is provided with a pressure-regulating valve allowing a gas inside the case to escape outward when a pressure inside the case rises to a given value or higher.

15. The capacitor according to claim 1, wherein an inner peripheral surface at the through hole and part of front and back surfaces, which is linked to the inner peripheral surface, of at least one of the terminal plate and the case provided with the through hole are provided with an insulating layer.

16. The capacitor according to claim 15, wherein the insulating layer is made of polypropylene resin.

17. The capacitor according to claim 15, wherein the insulating layer is made of a mixture of one selected from butyl rubber, ethylene-propylene rubber, and styrene-butadiene rubber; and one selected from alicyclic petroleum resin, aliphatic petroleum resin, and terpene resin.

* * * * *